(12) United States Patent
Suzuki et al.

(10) Patent No.: US 7,862,674 B2
(45) Date of Patent: Jan. 4, 2011

(54) FORMING METHOD FOR ASSEMBLY OF BEAD CORE AND APEX RUBBER

(75) Inventors: Masumi Suzuki, Kobe (JP); Shuichi Yamamori, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1020 days.

(21) Appl. No.: 11/640,888

(22) Filed: Dec. 19, 2006

(65) Prior Publication Data
US 2007/0137765 A1 Jun. 21, 2007

(30) Foreign Application Priority Data
Dec. 21, 2005 (JP) .............................. 2005-368459

(51) Int. Cl.
*B29D 30/48* (2006.01)
*B60C 15/06* (2006.01)

(52) U.S. Cl. ................... 156/136; 152/541; 156/117; 156/135; 156/422

(58) Field of Classification Search ............... 156/117, 156/136, 135, 397, 422; 152/541
See application file for complete search history.

(56) References Cited

U.S. PATENT DOCUMENTS

| 2003/0102088 A1 | 6/2003 | Iiduka | |
|---|---|---|---|
| 2007/0215265 A1* | 9/2007 | Sata | 156/110.1 |

FOREIGN PATENT DOCUMENTS

| EP | 0 887 210 A2 | 12/1998 |
|---|---|---|
| EP | 1 595 692 A1 | 11/2005 |
| EP | 1 683 628 A1 | 7/2006 |
| JP | 60-157840 A * | 8/1985 |
| JP | 2000-94542 A | 4/2000 |
| JP | 2000-202921 A | 7/2000 |
| JP | 2002-355878 A | 12/2002 |
| JP | 2002-361757 A | 12/2002 |
| JP | 2005-153145 A * | 6/2005 |
| WO | WO-89/04250 A1 | 5/1989 |
| WO | WO-2005/035230 A1 | 4/2005 |

OTHER PUBLICATIONS

Machine Translation of JP 2002-355878 (patent document published Dec. 10, 2002).*
Machine Translation of JP 2002-361757 (patent document published Dec. 18, 2002).*
Machine Translation of JP 2005-153145 (patent document published Jun. 16, 2005).*

* cited by examiner

*Primary Examiner*—Geoffrey L Knable
(74) *Attorney, Agent, or Firm*—Birch, Stewart, Kolasch & Birch, LLP

(57) ABSTRACT

In a forming method for forming an assembly of a bead core and an apex rubber, there is used a rotating body which comprises a rotating base substance having an assembly forming surface, and a core receiving portion projecting from the rotating base substance in the axially outward direction of the rotating base substance. The core receiving portion projecting has a receiving surface supporting the radially inner peripheral surface of the bead core.

The apex rubber is formed by winding an unvulcanized rubber strip along the assembly forming surface from a starting position constituted by the radially outer peripheral surface of the bead core supported on the receiving surface so as to laminate in a tapered cross sectional shape.

3 Claims, 6 Drawing Sheets

FORMING METHOD FOR ASSEMBLY OF BEAD CORE AND APEX RUBBER

BACKGROUND OF THE INVENTION

1. Field of the Invention

The present invention relates to a forming method for forming an assembly of a bead core and an apex rubber, and more particularly to a method of forming an apex rubber having a triangular cross sectional shape on an outer peripheral surface in a radial direction of a bead core, by winding a ribbon-shaped rubber strip.

2. Description of the Related Art

In a pneumatic tire, demand characteristics are different in respective positions. Accordingly, the pneumatic tire is formed by various tire rubber members having differentiated compositions and cross sectional shapes, for example, a tread rubber, a sidewall rubber, a clinch rubber, an inner liner rubber and the like. conventionally, in each of the tire rubber members, there is used a molded body extrusion molded by a rubber extruding machine so as to have a desired cross sectional shape. Further, each of the rubber members is formed by winding the molded body on a molding drum or the like at one circle, in a green tire molding step.

With respect to the extrusion molding method, a change to a strip wind method has been promoted in recent years. This strip wind method is a method of directly forming a strip wind body having a desired cross sectional shape as a tire rubber member on a cylindrical molding drum by spirally winding a ribbon-shaped rubber strip. In this method, great advantages are applied to the tire having a strong tendency of a large item small scale production, for example, it is not necessary to store the molded body for the rubber member as an intermediate stock, it is not necessary to use a large-scaled rubber extruding machine, and the like.

However, the apex rubber corresponding to one of the tire rubber member has a special cross sectional shape extending in a triangular cross sectional shape toward an outer side in a radial direction from an outer peripheral surface of the bead core. Accordingly, it is technically hard to form easily and with a high quality in accordance with the strip wind method. Further, the apex rubber is treated as an assembly previously bonded to the bead core integrally, in a green tire manufacturing line. For these reasons, the formation of the apex rubber in accordance with the strip wind method has not yet been made practicable.

SUMMARY OF THE INVENTION

Accordingly, an object of the present invention is to provide a forming method for an assembly of a bead core and an apex rubber, which can make formation of an apex rubber in accordance with a strip wind method practicable, and can form an assembly obtained by bonding the bead core and the apex rubber efficiently and easily with a high quality.

In order to achieve the object mentioned above, in accordance with a first aspect of the present invention, there is provided a forming method for forming an assembly of a bead core and an apex rubber, the assembly comprising the bead core, and the apex rubber arranged on a radially outer peripheral surface of the bead core and having a triangular cross sectional shape, comprising the steps of:

using a rotating body comprising
 a rotating base substance having an assembly forming surface, and
 a core receiving portion having a receiving surface supporting the radially inner peripheral surface of the bead core, and projecting from said rotating base substance in the axially outward direction of said rotating base substance; and forming the apex rubber by winding a rubber strip along the assembly forming surface from a starting position constituted by the radially outer peripheral surface of the bead core supported on the receiving surface so as to laminate in a tapered cross sectional shape. The rubber strip is made of an unvulcanized rubber and has a strip width (Wg) between 5 and 20 mm and a strip thickness (Tg) between 0.5 and 2.0 mm.

The assembly forming surface can be formed by one side surface in an axial direction of the rotating base substance extending radially outward from the receiving surface. Further, the assembly forming surface can be formed by a radially outer peripheral surface of the rotating base substance extending to an inner side in an axial direction via a step surface from the receiving surface.

Since the present invention is structured as mentioned above, it is possible to make the formation of the apex rubber in accordance with the strip wind method practicable, and it is possible to form the assembly of the bead core and the apex rubber made of the rubber strip efficiently and easily with a high quality.

DETAILED DESCRIPTION OF THE PREFERRED EMBODIMENTS

Figure 5:
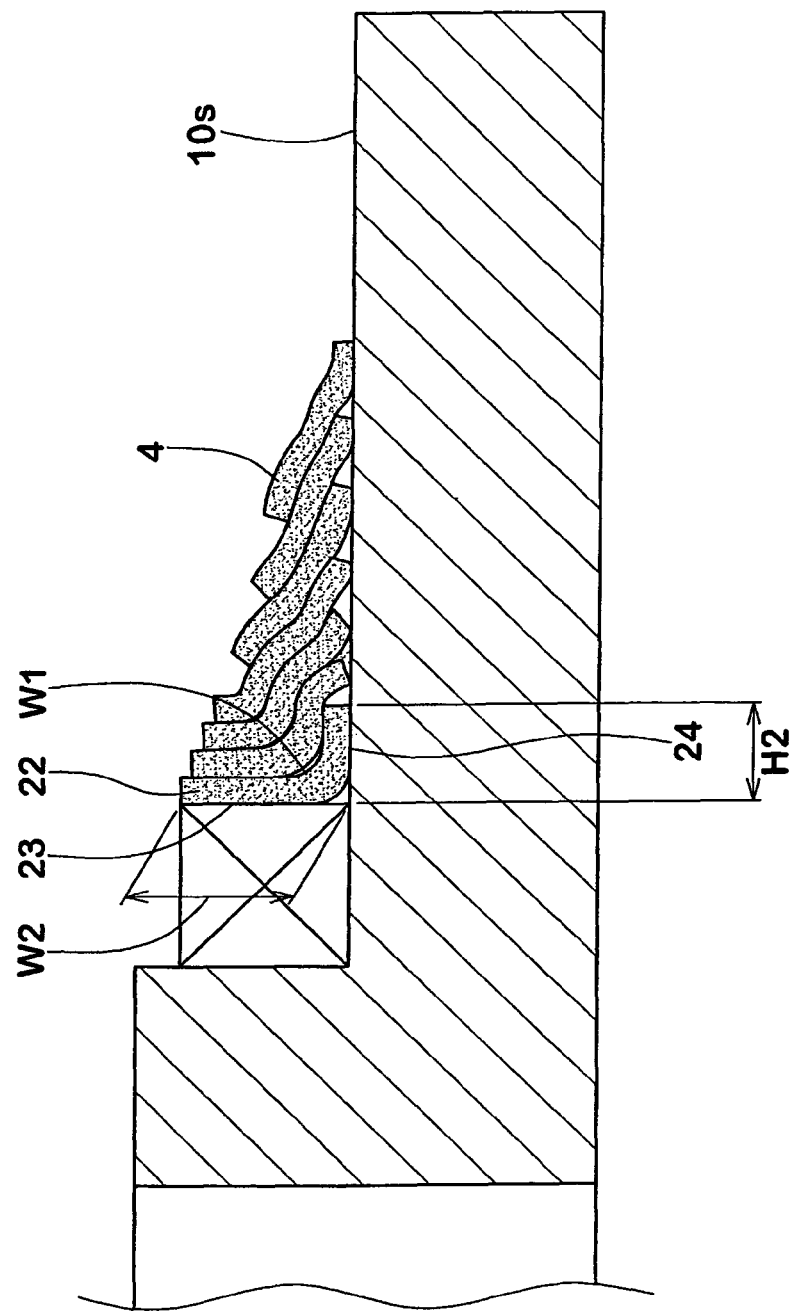
FIG. 5 is a cross sectional view showing a main portion of a second embodiment of the forming method for the assembly of the bead core and the apex rubber in accordance with the present invention.
Figure 6:
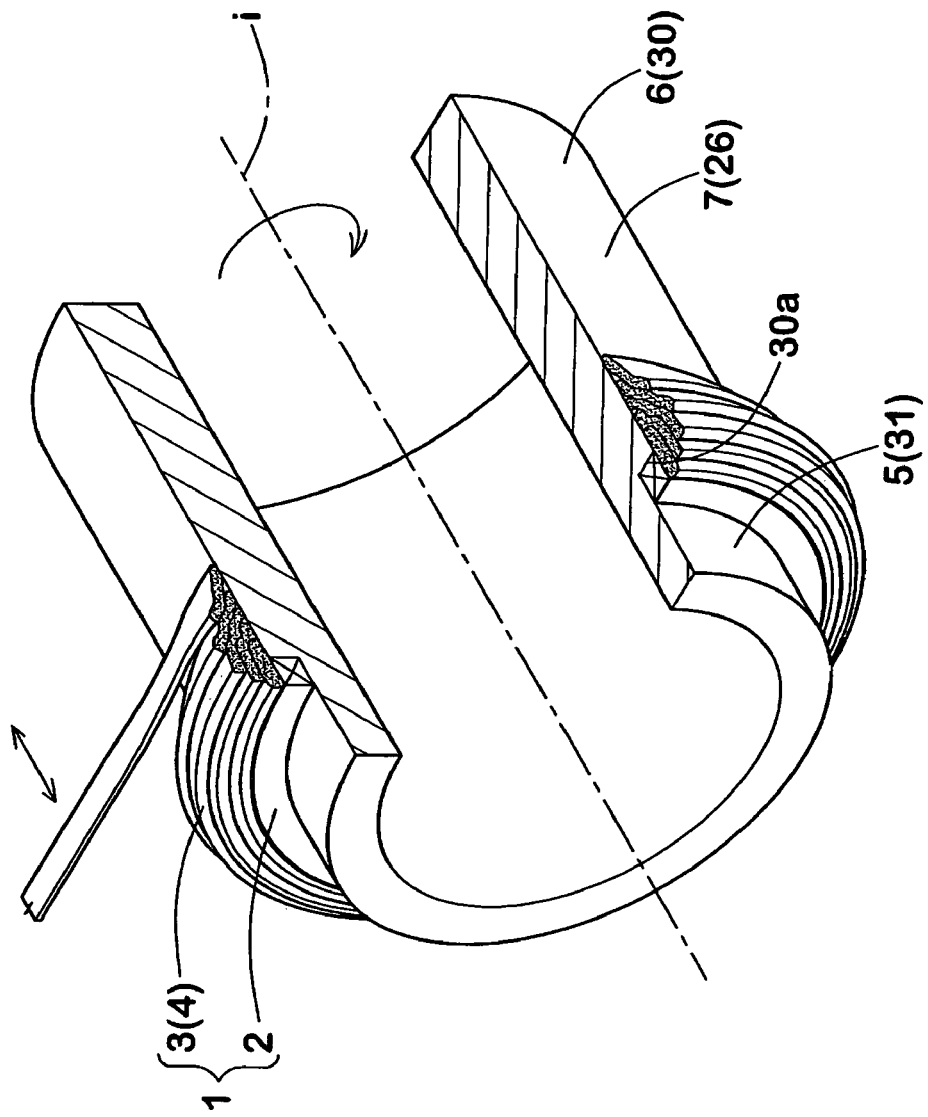
FIG. 6 is a perspective view explaining a third embodiment of the forming method for the assembly of the bead core and the apex rubber in accordance with the present invention.
Figure 7:
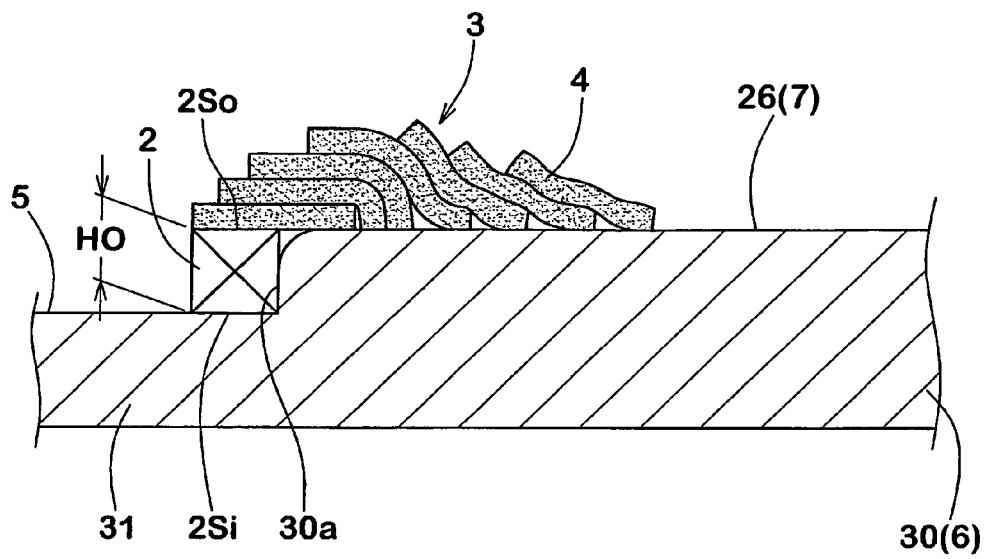
FIG. 7 is a cross sectional view showing a main portion of the third embodiment in an enlarged manner.

A description will be given below of an embodiment in accordance with the present invention together with an illustrated example. FIGS. 1 to 4 show a first embodiment of a forming method for an assembly of a bead core and an apex rubber in accordance with the present invention, FIG. 5 shows a second embodiment, and FIGS. 6 and 7 show a third embodiment.

Figure 1:
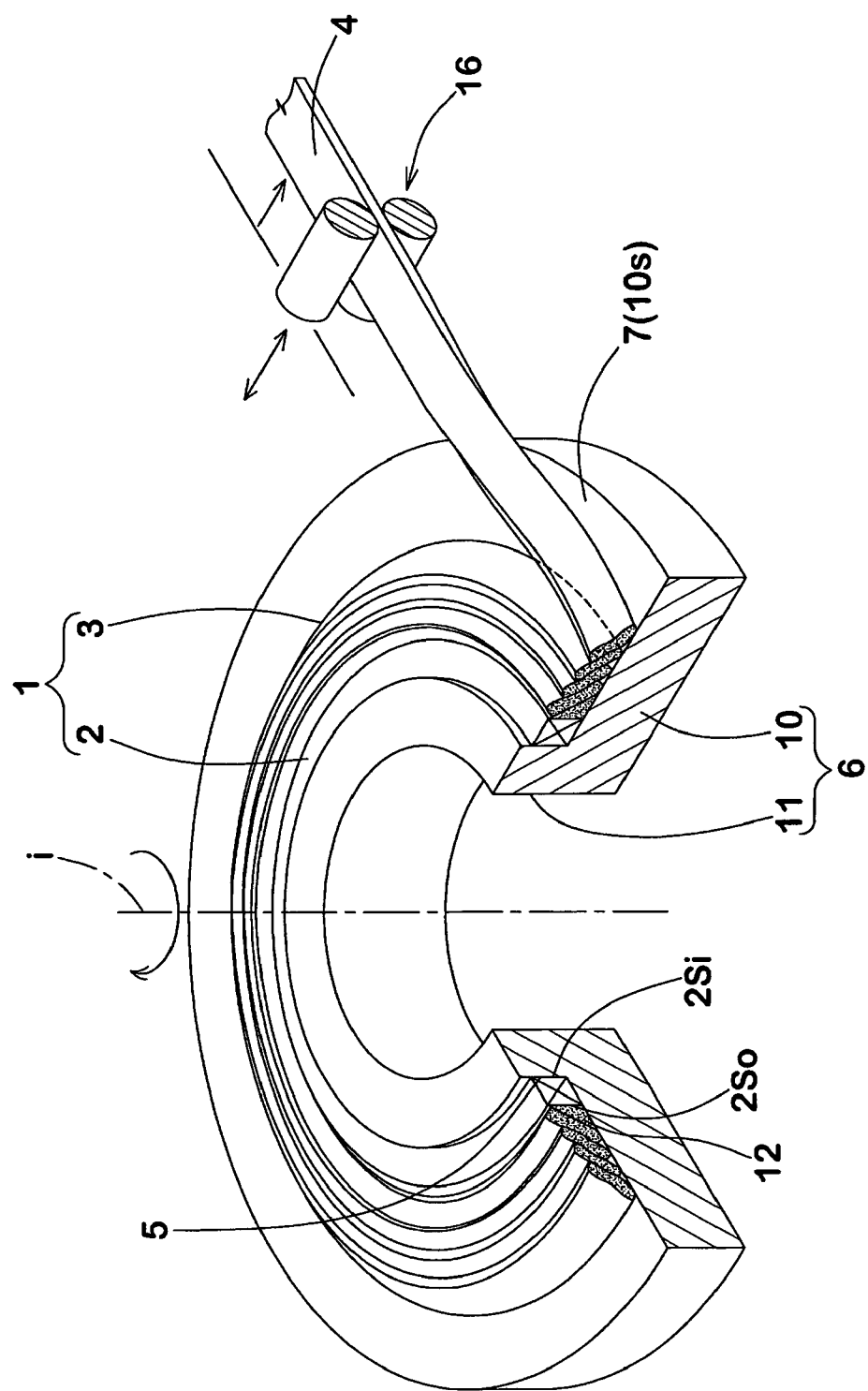
FIG. 1 is a perspective view explaining a first embodiment of a forming method for an assembly of a bead core and an apex rubber in accordance with the present invention.
Figure 2:
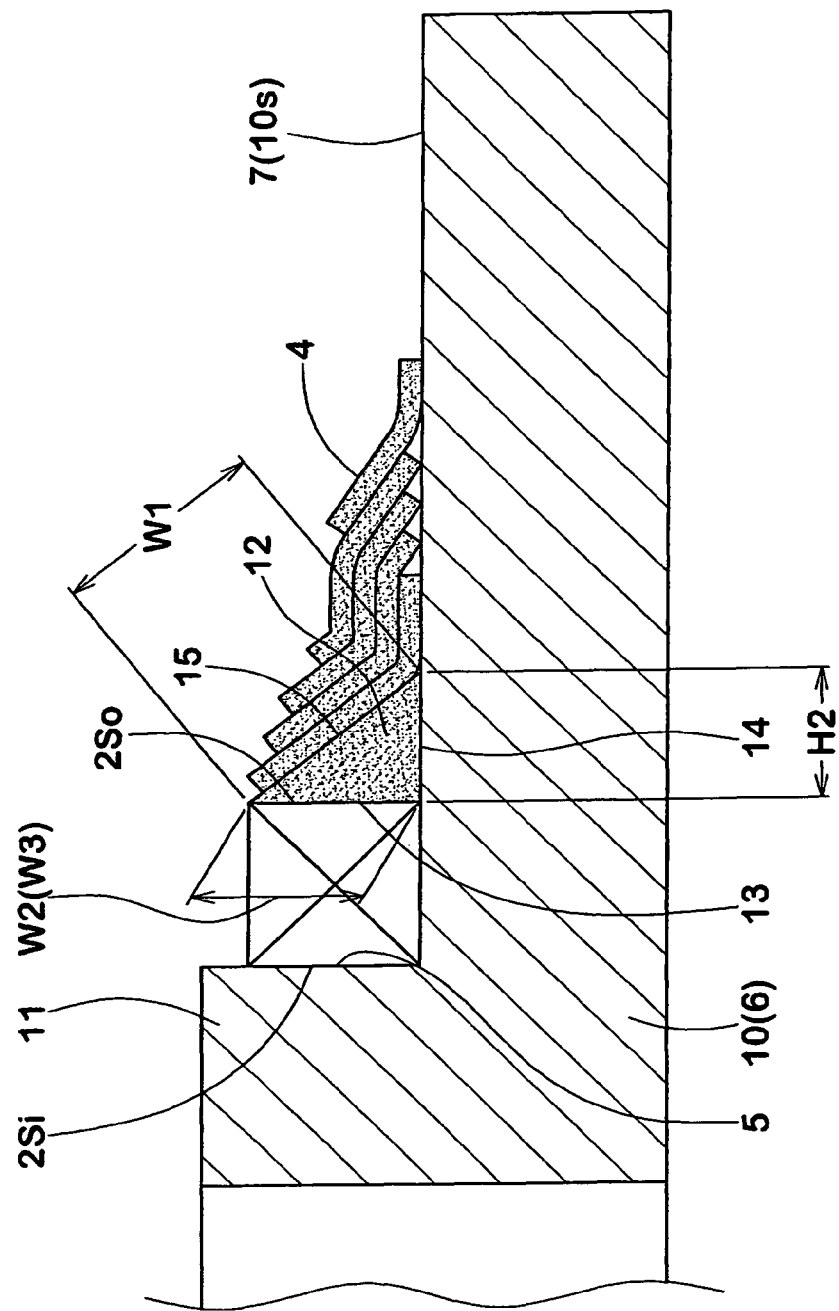
FIG. 2 is a cross sectional view showing a main portion of the first embodiment in an enlarged manner.
Figure 3:
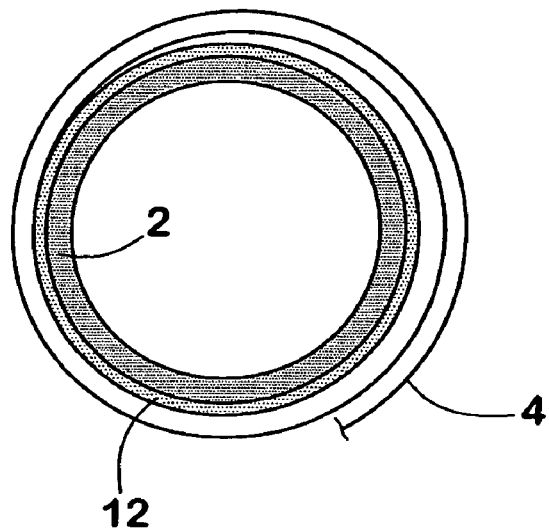
FIG. 3 is a plan view conceptually showing a winding method of a rubber strip.
Figure 4:
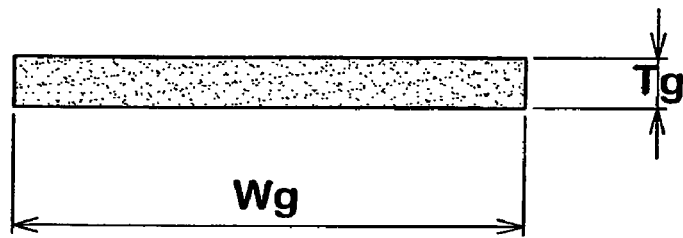
FIG. 4 is a cross sectional view of the rubber strip.

As shown in FIGS. 1 and 2, in a forming method for an assembly 1 between a bead core and an apex rubber (hereinafter, refer simply to as an assembly 1) in accordance with the present invention, the assembly 1 is formed by forming an apex rubber 3 on an outer peripheral surface 2So in a radial direction of a bead core in accordance with a strip wind method. Specifically, there is employed a rotating body 6 having an annular receiving surface 5 supporting an inner peripheral surface 2Si in a radial direction of the bead core 2. Further, the apex rubber 3 is formed by winding a rubber strip 4 along an assembly forming surface 7 of the rotating body 6 in a tapered cross sectional shape, starting from the outer peripheral surface 2So in the radial direction in the bead core 2 supported by the receiving surface 5.

In the first embodiment, the rotating body 6 is provided with a rotating base substance 10, for example, having a disc shape, supported so as to be rotatable around an axis i, in the present embodiment. One side surface 10s in an axial direction of the rotating base substance 10 is provided in a protruding manner with a core receiving portion 11 having a receiving surface 5 supporting the inner peripheral surface 2Si in the radial direction of the bead core 2 coaxially with the axis i in an outer side in the axial direction. The receiving surface 5 is formed by an outer peripheral surface in the radial direction of the core receiving portion 11. Further, the assembly forming surface 7 is formed by the side surface 10s of the rotating base substance 10 extending outward in the radial direction from the receiving surface 5.

Further, a base rubber 12 having a small triangular cross sectional shape and making a circuit in a peripheral direction is arranged in the outer peripheral surface 2So in the radial direction of the bead core 2. The base rubber 12 is formed in a right angled triangular cross sectional shape constituted by a bottom surface 13 brought into contact with the outer peripheral surface 2So in the radial direction of the bead core 2, a rising surface 14 brought into contact with the side surface 10s (the assembly forming surface 7) so as to be orthogonal to the bottom surface 13, and a connection surface 15 corresponding to a slope surface joining the bottom surface 13 and the rising surface 14, as shown in FIG. 2. The base rubber 12 comes to a core for winding the rubber strip 4 in the triangular cross sectional shape, it is necessary that a width W1 along the connection surface of the connection surface 15 is equal to or less than a strip width Wg (shown in FIG. 4) of the rubber strip 4, and the width W1 is preferably equal to or less than 90% of the width Wg. In this case, in the case of W1>Wg, it is impossible to efficiently form the apex rubber 3 having the triangular cross sectional shape. Further, a width W2 in an axial direction of the bottom surface 13 in the base rubber 12 mentioned above is approximately equal to a width W3 in the axial direction of the outer peripheral surface 2So in the radial direction in the bead core 2, and is preferably set to a range 1.0±0.2 times of the width W3. In this case, if the base rubber 12 is too small, it is hard that the base rubber 12 serves as the core, and there is a tendency that a forming precision of the apex rubber 3 is lowered. Accordingly, it is preferable that a height H2 in the radial direction of the rising surface 14 is equal to or more than 50% of the width W2.

In this case, the base rubber 12 forms a part of the apex rubber 3 mentioned above. Accordingly, the base rubber 12 is normally formed by the same rubber composition as the rubber strip 4. However, the base rubber 12 can be formed by a different rubber compound, for example, the base rubber 12 is formed by a hard rubber (in which a rubber hardness after vulcanization is large) in comparison with the rubber strip 4. Further, the base rubber 12 is formed by winding a long rubber having a small triangular cross sectional shape at one circle. In this case, the base rubber 12 can be previously attached to the bead core 2 integrally prior to an installation of the bead core 2 to the rotating body 6. However, after installing the bead core 2 to the rotating body 6, the base rubber 12 may be attached to the bead core 2.

Next, the rubber strip 4 is wound. In the winding method, the rubber strip 4 is laminated in a tapered cross sectional shape by winding the rubber strip 4 in a spiral shape (shown in FIG. 3) toward an outer side in the radial direction from the connection surface 15 of the base rubber 12 and along the assembly forming surface 7. The spiral winding can be executed by horizontally moving a discharge roller 16 discharging the rubber strip 4 to the rotating body 6 in parallel to one radial line of the rotating body 6, as shown in FIG. 1. In this case, the wound rubber strip 4 is pressure welded firmly to each other by a crimp roller (not shown).

In this case, as the rubber strip 4, it is possible to use a rubber strip in such a range that the strip width Wg is between 5 and 20 mm, and the strip thickness Tg is between 0.5 and 2.0 mm.

In the case that the strip width Wg is less than 5 mm, it is impossible to form the apex rubber 3 in a triangular cross sectional shape at a high precision. Further, in the case that the strip thickness Tg is less than 0.5 mm, a forming efficiency is deteriorated, for example, the winding number is increased, or the like. Inversely, if the strip width Wg gets over 20 mm, and the strip thickness Tg gets over 2.0 mm, a tension difference between an inner edge side in the radial direction of the rubber strip 4 and an outer edge side becomes too large, at a time of winding in the spiral shape, so that there is generated a problem that a deformation such as a great curling of the apex rubber 3 or the like is caused, after taking out from the rotating body 6.

Next, FIG. 5 shows a second embodiment of the forming method for the assembly 1. only the base rubber is different between the first embodiment and the second embodiment. In other words, while the base rubber 12 having the triangular cross sectional shape is used in the first embodiment, a base rubber 22 having an L-shaped cross section is used in the second embodiment.

The base rubber 22 having the L-shaped cross section is constituted by a bottom surface 23 brought into contact with the outer peripheral surface 2So in the radial direction of the bead core 2, a rising surface 14 brought into contact with the side surface 10s (the assembly forming surface 7) so as to be orthogonal to the bottom surface 23, and a connection surface 25 corresponding to an L-shaped surface joining the bottom surface 13 and the rising surface 14, and is formed in an L-shaped cross sectional shape. The base rubber 22 having the L-shaped cross section is preferably structured such that a width W1 along the connection surface 25, a width W2 in an axial direction of the bottom surface 23 and a height H2 in a radial direction of the rising surface 24 are regulated within the same range of the widths W1 and W2 and the height H2 in the case of the base rubber 12 having the triangular cross sectional shape, in the same manner as the base rubber 12 having the triangular cross sectional shape.

Further, the rubber strip 4 is wound spirally along the assembly forming surface 7 from the connection surface 25 of the base rubber 22 toward the outer side in the radial direction in such a manner as to be laminated in a tapered cross sectional shape. Accordingly, the apex rubber 3 is formed in cooperation with the base rubber 22. In this second embodiment, it is possible to form the base rubber 22 and the rubber strip 4 independently, however, it is preferable to form the base rubber 22 by winding the rubber strip 4 at a first circle in the sight of a workability.

Next, FIGS. 6 and 7 show a third embodiment of the forming method for the assembly 1. In this third embodiment, a cylindrical rotating body 6 is used. The rotating body 6 is provided with a cylindrical rotating base substance 30 supported so as to be rotatable around an axis i. An outer end portion in an axial direction of the rotating base substance 30 is provided in a protruding manner with a core receiving portion 31 having the receiving surface 5 supporting the inner peripheral surface 2Si of the bead core 2 coaxially with the axis i, in an outer side in the axial direction. The receiving surface 5 is formed by an outer peripheral surface in the radial direction of the core receiving portion 11.

Further, the assembly forming surface 7 is formed by an outer peripheral surface in a radial direction of the rotating base substance 30 corresponding to a cylindrical surface 26 extending to an inner side in an axial direction from an outer edge in a radial direction of a step surface 30a extending outward in the radial direction from the receiving surface 5, via the step 30a. At this time, a height of the step surface 30a is substantially equal to a height H0 in the radial direction of the bead core 2. Accordingly, in the third embodiment, the outer peripheral surface 2So in the radial direction of the bead core 2 is substantially aligned with the cylindrical surface 26 (the assembly forming surface 7) in a flush manner.

Further, the rubber strip 4 is wound around the aligned surface. In a winding method, the rubber strip 4 is spirally wound toward an inner side in the axial direction on the cylindrical surface 26 (the assembly forming surface 7) from the outer peripheral surface 2So in the radial direction of the bead core 2, and is laminated in the tapered cross sectional shape. Accordingly, the apex rubber 3 is formed. The apex rubber 3 is formed in the triangular cross sectional shape by being risen up to the outer side in the radial direction at a time of forming the green tire. At this time, it is preferable that the strip width Wg of the rubber strip 4 is larger than the width in the axial direction off the outer peripheral surface 2So in the radial direction of the bead core 2.

Figure 8:
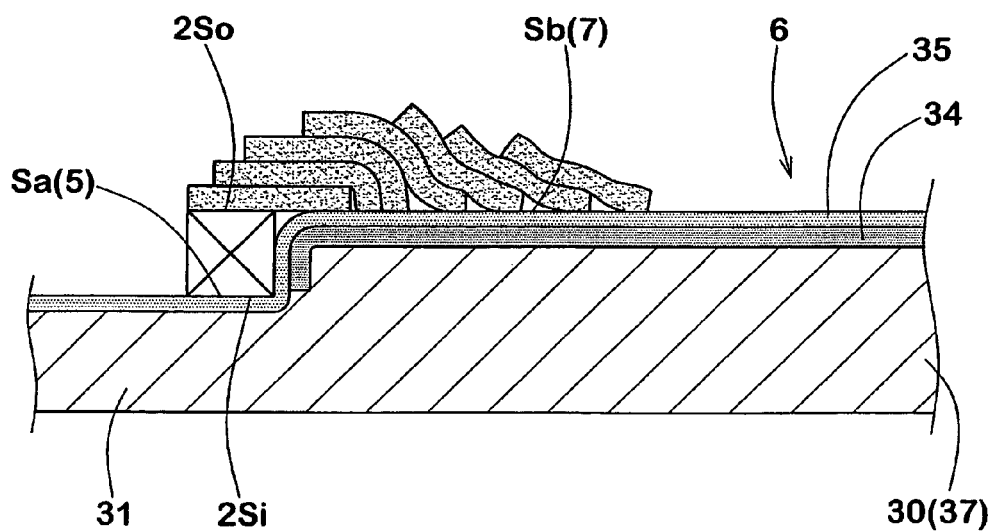
FIG. 8 is a cross sectional view showing the other example of the third embodiment.

The apex rubber 3 can be formed on the bead core 2 in the green tire forming. In other words, as shown in FIG. 8, as the rotating body 6, there is employed a first former 37 provided in a protruding manner with the core receiving portion 31 in both end portions of the cylindrical rotating base substance 30. On the rotating base substance 30, there are sequentially formed a tire member including a green inner liner rubber 34 and a green carcass ply 35. Thereafter, both end portions of the green carcass ply 35 are narrowed down along the core receiving portion 31, and the bead core 2 is installed onto the core receiving portion 31 via the green carcass ply 35. Further, the rubber strip 4 is spirally wound on the outer peripheral surface of the green carcass ply 35 arranged in the rotating base substance 30 toward the inner side in the axial direction from the outer peripheral surface 2So in the radial direction of the bead core 2. Accordingly, in the present embodiment, the rotating body 6 is formed by the first former 37 and the tire member. Further, an outer peripheral surface Sa of the tire member arranged on the core receiving portion 31 constitutes the receiving surface 5, and an outer peripheral surface Sb of the tire member arranged on the rotating base substance 30 constitutes the assembly forming surface 7.

The description is in detail given above of the particularly preferable embodiments in accordance with the present invention, however, the present invention is not limited to the illustrated embodiments, but can be achieved by modifying to various aspects.

What is claimed is:

1. A forming method for forming an assembly of a bead core and an apex rubber, the assembly comprising the bead core, and the apex rubber arranged on a radially outer peripheral surface of the bead core and having a triangular cross sectional shape, comprising the steps of:
   using a rotating body comprising
   a rotating base portion having an assembly forming surface, and
   a core receiving portion having a receiving surface supporting the radially inner peripheral surface of the bead core, and projecting from said rotating base portion in the axially outward direction of said rotating base portion,
   the assembly forming surface being constituted by one side surface in an axial direction of the rotating base portion and extending radially outward from the receiving surface; and
   forming the apex rubber by winding a rubber strip along the assembly forming surface from a base rubber set on the radially outer peripheral surface of the bead core supported on the receiving surface,
   said rubber strip made of an unvulcanized rubber and having a strip width (Wg) between 5 and 20 mm and a strip thickness (Tg) between 0.5 and 2.0 mm,
   wherein said base rubber has an L-shaped cross sectional shape provided with a bottom surface brought into contact with the radially outer peripheral surface of the bead core, a rising surface brought into contact with the assembly forming surface so as to be orthogonal to the bottom surface, and a connection surface corresponding to an L-shaped surface joining the bottom surface and the rising surface, a height in the radial direction of the rising surface being equal to or more than 50% of the width (W2) in the tire axial direction of the bottom surface, and
   wherein the rubber strip is spirally wound to an outer side in the radial direction from the connection surface of the base rubber along the assembly forming surface so as to laminate in a tapered cross sectional shape.

2. A forming method for forming an assembly of a bead core and an apex rubber as claimed in claim 1, wherein the base rubber is formed by an initial winding turn of the rubber strip.

3. A forming method for forming an assembly of a bead core and an apex rubber, the assembly comprising the bead core, and the apex rubber arranged on a radially outer peripheral surface of the bead core and having a triangular cross sectional shape, comprising the steps of:
   using a rotating body comprising
   a rotating base portion having an assembly forming surface, and
   a core receiving portion having a receiving surface supporting the radially inner peripheral surface of the bead core, and projecting from said rotating base portion in the axially outward direction of said rotating base portion;
   the assembly forming surface being constituted by a radially outer peripheral surface of the rotating base portion, and extending to an inner side in an axial direction from an outer edge in a radial direction of a step surface, said step surface extending radially outward from the receiving surface, and
   forming the apex rubber by winding a rubber strip along the assembly forming surface from the radially outer peripheral surface of the bead core supported on the receiving surface,
   said rubber strip made of an unvulcanized rubber and having a strip width (Wg) between 5 and 20 mm and a strip thickness (Tg) between 0.5 and 2.0 mm,
   wherein the rubber strip is spirally wound to an inner side in the axial direction from the radially outer peripheral surface of the bead core along the assembly forming surface so as to laminate in a tapered cross sectional shape, and
   wherein the radially outer peripheral surface of the bead core is substantially aligned with the assembly forming surface in a flush manner, and the strip width (Wg) of the rubber strip is larger than a width in an axial direction of the axially outer peripheral surface of the bead core.

* * * * *